May 15, 1951 R. W. HOVELL 2,553,194
MACHINE FOR TURNING AND PRESSING COLLARS
Filed Feb. 8, 1949 4 Sheets-Sheet 1

FIG.I.

INVENTOR
REYNOLDS W. HOVELL
BY
ATTORNEY

May 15, 1951 R. W. HOVELL 2,553,194
MACHINE FOR TURNING AND PRESSING COLLARS
Filed Feb. 8, 1949 4 Sheets-Sheet 2

INVENTOR
REYNOLDS W. HOVELL
BY Victor D. Borst
ATTORNEY

May 15, 1951 R. W. HOVELL 2,553,194
MACHINE FOR TURNING AND PRESSING COLLARS
Filed Feb. 8, 1949 4 Sheets-Sheet 3

INVENTOR
REYNOLDS W. HOVELL
BY
ATTORNEY

May 15, 1951 R. W. HOVELL 2,553,194
MACHINE FOR TURNING AND PRESSING COLLARS
Filed Feb. 8, 1949 4 Sheets-Sheet 4
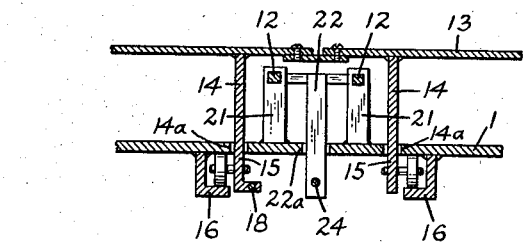
FIG.5.
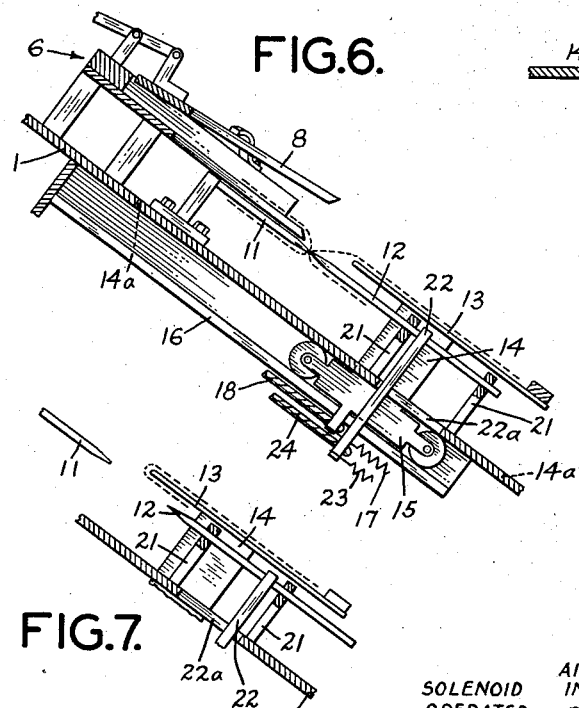
FIG.6.
FIG.7.
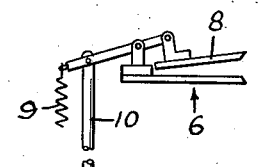
FIG.8.
FIG.10.
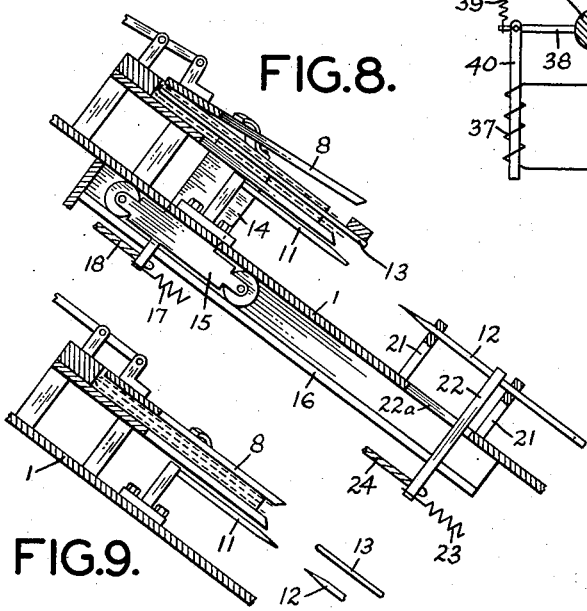
FIG.9.
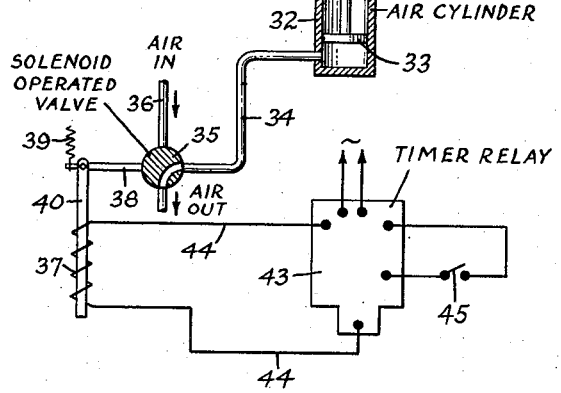
INVENTOR
REYNOLDS W. HOVELL
BY
ATTORNEY Patented May 15, 1951

2,553,194

UNITED STATES PATENT OFFICE 2,553,194

MACHINE FOR TURNING AND PRESSING COLLARS

Reynolds W. Hovell, Tupelo, Miss., assignor to Blue Bell, Inc., Greensboro, N. C., a corporation of North Carolina Application February 8, 1949, Serial No. 75,207

5 Claims. (Cl. 223—2)

This invention is an improvement upon a conventional and well known type of automatic machine which is used in the garment manufacturing trade for turning collars and cuffs in-side-out from the state in which they are initially stitched and then shaping and pressing them. It will be illustrated and described primarily for the treatment of collars although its further and analogous uses are well known and will be evident.

The general type of machine to which this invention constitutes an improvement is shown in Patent No. 1,902,330 of March 21, 1933, to Morris L. Kaplan. In its commercial form, this machine has three pedals which the operator uses in succession, the first one to bring points together to enable the operator to turn the collar (or other article) and to pull it over the die or shaping member, the second one to insert the die member with the collar on it into the presser head from which the die member is automatically retracted, leaving the collar in the presser head, and the third one to close the presser head and apply heat and pressure to the collar.

It is the operation of this third pedal which is most exacting upon the operator. The degree of pressure is, as a rule, determined by the force exerted upon the pedal, and duration of pressure is determined wholly by the length of time that the operator holds the pedal down. This imposes a strain upon the operator which is tiring, and also necessitates considerable skill to determine the amount of pressure and duration of time for the operation.

An object of this invention is to make the operation heretofore performed by this third pedal wholly automatic and thereby relieve the operator of the responsibility and strain above mentioned and make the operation of the machine more dependable and uniform. Other objects and advantages will appear as the invention is described.

In accordance with the invention, a power device is provided to close the presser head and apply the pressure which, through appropriate time limiting intermediary means, is enabled or activated for a predetermined period by the return movement of the die member from placing the collar in the presser head and then is automatically disabled or inactivated at the expiration of the predetermined period.

The specific assembly of mechanism which has proved satisfactory for the purpose and from present experience represents the preferred embodiment of the invention, is illustrated in the accompanying drawings, in which Fig. 1 is a perspective of a machine embodying the invention, showing the machine principally in front elevation.

Fig. 5 is an enlarged sectional detail on line 5—5 of Fig. 1.

Fig. 6 is a section on line 6—6 of Fig. 1, showing the movable points in advanced position.

Fig. 7 is a similar view of a fragment of the parts in Fig. 6, showing the movable points retracted.

Fig. 8 is a section similar to Fig. 6 but showing the die member advanced into the presser head.

Fig. 9 is similar view of the presser head portion showing the collar in the presser head and under pressure.

Fig. 10 is a diagram of the automatic system which supplants the usual third pedal.

Figure 1:
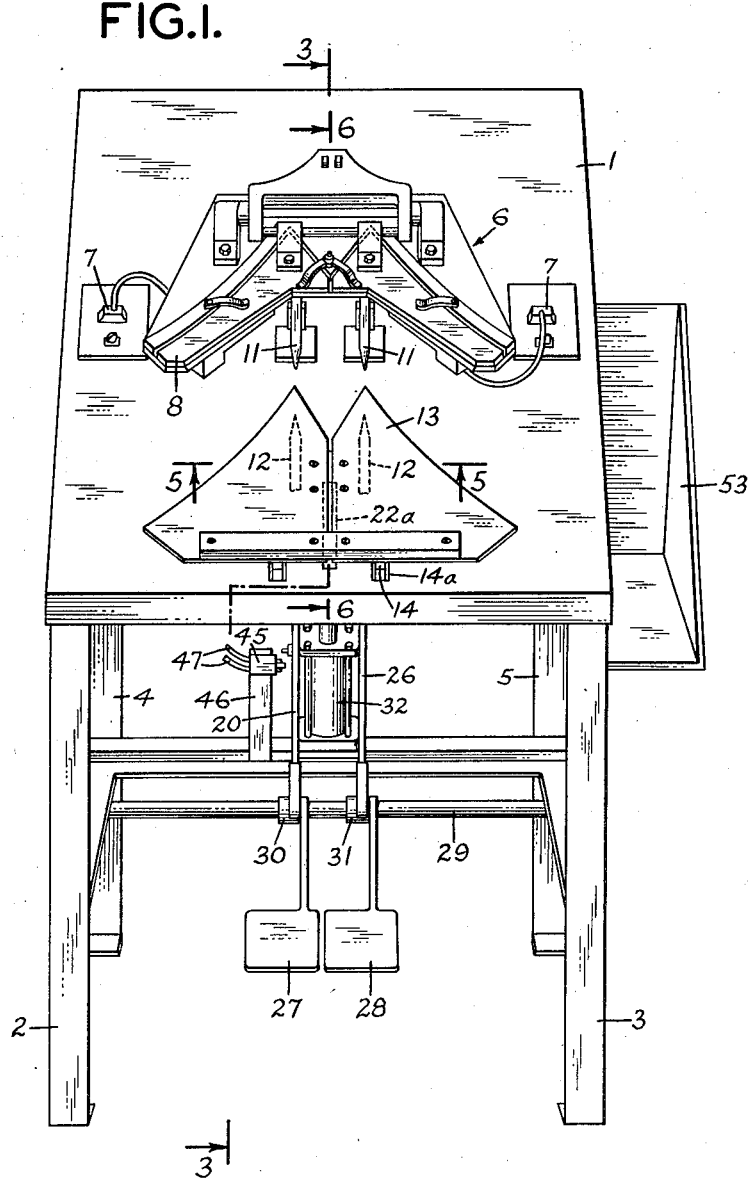
Figure 2:
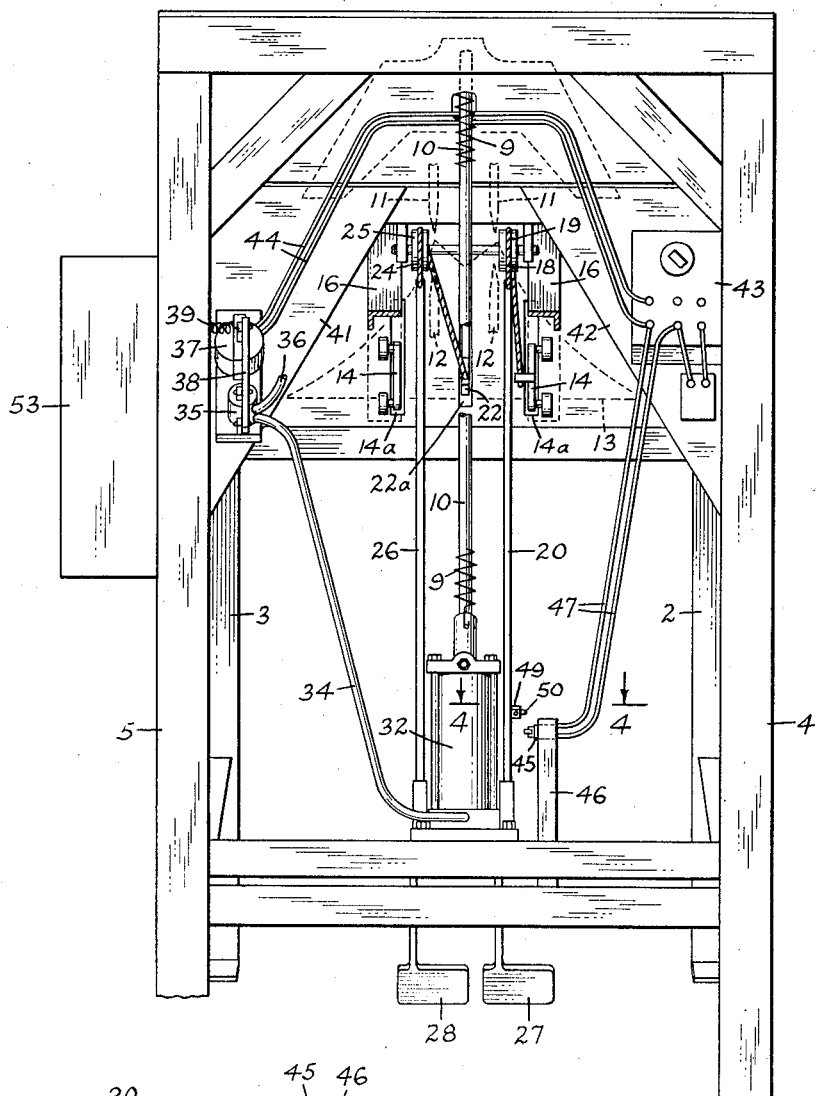
Fig. 2 is a perspective of the same with parts broken away, showing the machine as viewed from the rear.

For an understanding of the purpose of the machine, reference is made to the prior patents to W. J. Beattie, Nos. 1,795,704 and 1,896,934, in which the pertinent practice regarding the manufacture of collars is explained. Suffice it to say that collars are commonly made by stitching together three plies of fabric, cut according to pattern, along the curved bottom edge and along each end, leaving the top edge which is eventually sewed to the garment open. The collar is then turned in-side-out through the open edge, which makes a bunching of material in the points. Commonly thin flat angle shaped plates, called dies, are inserted into the collars with the angle apices in the points to arrange the bunched material and shape the collar points, and the collar points are then pressed.

To turn the collar, it is the usual practice to place one of the points of the collar as it is initially stitched over a pin on the machine, called a point, and to bring another cooperative point, which is slidable and disposed immediately underneath the die, up to the first point, and strip the collar off the first point and turn it back over the second point and the die. The second point is then retracted, leaving the reversed collar on the die. The die is then moved into the presser head and the collar is left there as the die retreats, the collar point which is thus shaped being then pressed.

As will be seen from the drawings, the machine has an inclined table top 1, being highest at the rear, which is supported upon a frame consisting of four legs, namely two front legs 2 and 3 and two rear legs 4 and 5, with appropriate cross braces. On the upper part of the table is a presser head 6 which is of standard construction and need not be described in detail. It includes electrical resistance coils for heating when the plugs 7 are inserted into their sockets, and a movable presser member consisting of the plate 8 which rises to open the presser head and lowers to apply pressure. It is shown as pivoted upon a bracket on the top part of the head, there being in practice a special pivoting arrangement so that the movement of the presser member is approximately in a line normal to the head.

The head is shown as duplex, being generally V-shape, so that two collars may be received and pressed at the same time, each presser form being shaped to receive a collar point and a substantial portion of the collar body, the two forms together making substantially an M-shape presser recess. A spring 9 biases the presser member 8, which is of corresponding V-shape, to elevated or open position, and a piston rod 10 is connected to the presser member to operate it in opposition to its bias in a manner to be described. Between the diverging legs of the presser head and just below the level of the bottom of the head, are two parallel forwardly pointing pins 11, each of which constitutes one of a pair of cooperative points on which the collars are turned, as will be described. These points 11 are fixed, being supported by and attached to the table 1 through uprights bolted to the table as shown.

Farther down the table in front of and facing the presser head are two slidable members, one a pair of pins 12 constituting the points cooperative with the points 11, and the other a duplex die member 13, the outline of which is substantially M-shape to fit into the presser cavity of the presser member.

The die member rides up and down the table on a traveling carriage. As shown, the die member is attached on top of a pair of standards 14 that extend through slots 14a in the table, each standard being integral with the chassis of a roller truck 15 the wheels of which trucks run on tracks 16 underneath the table. A coilspring 17 is attached at one end to a lug on the bottom of the left hand truck 15 and at the other end to the machine frame and biases the sliding die member to its retracted position away from the presser head. A cable 18 is attached to the same lug on the bottom of the left hand truck 15 and runs up therefrom underneath the table over a pulley 19 and is attached at its other end to an arm 20 which is pedal operated, as will be described.

The points 12 are also slidable up and down the table to cause them to approach and recede from the respective coacting points 11. For this purpose they slide in guide openings in uprights 21 on the table and are connected by a T-member 22, the upright leg of which extends through a slot 22a in the table. A retractile spring 23 is attached to the bottom end of this upright leg and to the frame of the machine and biases the points 12 to retracted position. In the opposite direction a cable 24, attached to the leg, runs over a pulley 25 on the underside of the table and is connected at its other end to an arm 26 which is also pedal operated.

Figure 3:
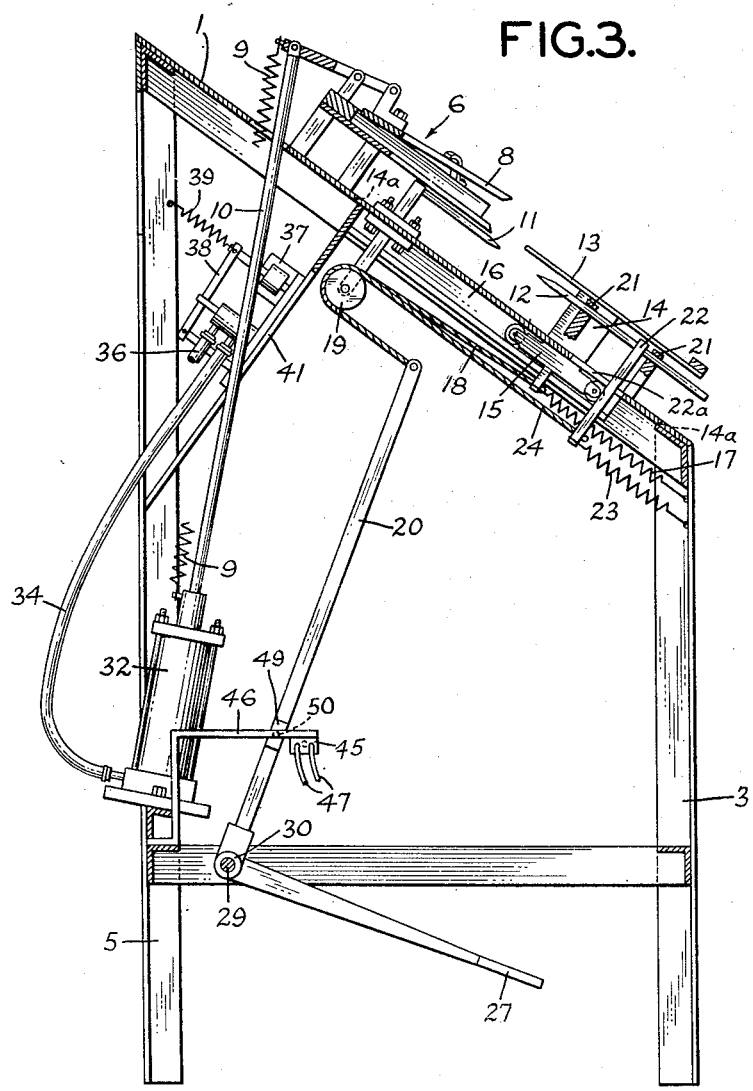
Fig. 3 is a sectional elevation generally on the planes of line 3—3 of Fig. 1.

It is evident from Fig. 3 that a movement of the top ends of arms 20 and 26 to the right or toward the front of the machine will pull the die member and the lower points up the table against their spring bias. Such movement is effected by pedals 27 and 28, respectively. A bearing shaft 29 extends across the lower part of the machine and is non-rotatably secured at its ends in frame members. Rotatable on this shaft are two collars 30 and 31, and the arm 20 and pedal 27 are secured to collar 30, while the arm 26 and pedal 28 are secured to collar 31. It is evident, therefore, that as the operator depresses pedal 28 the points 12 will be advanced and that as he depresses pedal 27 the die member will be moved up into the presser head, while releasing the pedals will allow the retractile springs to operate.

In the use of the machine, the operator places a collar as initially stitched upon each of the points 11 with the pins well into the corners or points at one end of the collars. He then depresses pedal 28 and thus brings points 12 up to points 11. This condition is illustrated in Fig. 6. Then the operator strips the collars, one by one, off the points 11 on to the points 12 and the respective points of die 13, the collars being reversed in the process. The two positions of the collars are indicated by broken lines in Fig. 6. The operator then releases pedal 28 and permits the spring 23 to retract points 12 and leave the collars on the die 13, as indicated in Fig. 7.

Next the operator depresses pedal 27 and advances the die member into the presser head, as is shown in Fig. 8. The collar points are well wedged into the corners of the presser recesses and are held there by the presser member, as is later described. The operator thereupon releases the pedal 27 and allows the spring 17 to retract the die member, which is the condition shown in Fig. 9.

So far, the explanation refers to machine construction and operation which is commercial and well known. It is in respect to the rest of the operation on the collars, namely, the pressing, as above stated, that this invention particularly relates.

In place of a third pedal, an automatic power mechanism is provided, the operation of which is initiated as a result of the release of pedal 27 and simultaneously with the withdrawal of the die member, to lower the presser member 8 to the position shown in Fig. 9 and start the pressing of the collars in the presser head. This is timed to occur slightly after withdrawal of the die member so that the presser member preferably grips the collars and holds them against displacement as the die member is withdrawn.

The power mechanism consists of an air cylinder 32 and piston 33 (Fig. 10), with the piston rod 10 connected to operate the presser member 8, as above explained. An air hose 34 leads to the bottom of the cylinder behind the piston from a valve 35 which in one position connects the cylinder with a source of compressed air 36 and in its other position vents the cylinder to atmosphere, which is the position shown in Fig. 10.

A solenoid 37 is arranged in control of valve 35. The operating arm 38 of the valve is constrained by means, such as a spring 39, to the venting position of the valve, and the armature 40 of the solenoid is connected to arm 38 to move the valve against its bias when the solenoid is energized and so admit the fluid pressure into cylinder 32 and close the presser head. The valve 35 and the solenoid 37 are supported in close relation upon a triangular supporting plate 41 on the back of the machine underneath the table and occupying the upper right hand corner as viewed from the front.

Symmetrically opposed to place 41 in the upper left hand corner is a corresponding triangular supporting plate 42 on which is an automatic electrical timer relay 43. This relay is connected to a source of electric current and also by leads 44 to the solenoid 37. This relay is of the type known as time delay relays and its nature is such that when the start circuit is closed the load circuit, in this case the solenoid 37, becomes energized and remains energized during the length of the time delay. The length of this delay is settable and at the end of the set time the relay automatically deenergizes the solenoid. A suitable timer relay for the purpose is one sold by General Control Company under the name of "Promatic Timer" and made under Patent No. 2,296,580 of September 22, 1942, to Gilbert Smiley.

In control of the start circuit of the timer relay is a micro-switch 45 supported on a bracket 46 attached to a rear frame member. Leads 47 connect the micro-switch to the relay.

Figure 4:
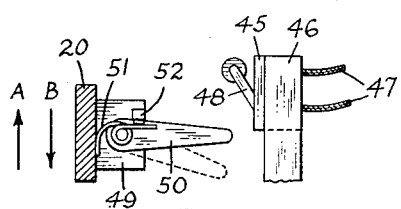
Fig. 4 is an enlarged detail in sectional plan on line 4—4 of Fig. 2.

The micro-switch is supported on its bracket approximate the arm 20 and with its operating arm 48 on the side toward the arm 20. On a bracket 49 (see Fig. 4) on the face of the arm 20 toward switch 45 is pivoted a projecting trip finger 50 which is urged by spring 51 against a stop 52. The location of the bracket and trip finger is such that the roller on the arm 48 of the switch is in the path of the trip finger on the oscillatory movement of the arm 20 in both directions. However, in the forward movement of the arm 20 produced by pedal 27 and indicated by arrow A in Fig. 4, the finger 50 upon striking the roller merely yields against the force of the spring 51 to a position indicated by dotted lines and so passes the switch idly without closing it. The finger springs back against its stop and on the return movement of arm 20 in the direction of arrow B, the finger 50 strikes the roller and closes the switch. The momentary or instantaneous closing of the switch operates the timer relay to close the solenoid circuit and hold it closed during the time set. This operates the air piston to close the presser head and hold it closed while the solenoid is energized. When the cycle is over the presser head rises under the influence of spring 9 and the operator turns the collars end for end and places the other ends on the leading points of the dies, steps on pedal 27 and repeats the operation for that end of the collars. When the presser member again rises the operator takes the collars from the presser head and deposits them in the bin 53 on the right side of the machine.

Thus it will be seen that the pressing operation is entirely automatically controlled, being initiated, timed and concluded by mechanism that is independent of the operator. It is obvious that the precise form of the mechanism employed is optional and that the invention may be variously otherwise embodied within the spirit and scope of the appended claims.

What is claimed is:

1. A machine for shaping and pressing collars and like articles comprising, in combination with a presser head including a movable presser member and a slidable die member adapted to receive and shape an article and to deposit the article in the presser head, means biasing the die member from the presser head, manually controlled means for sliding the die member against its bias toward the presser head including a pivotally oscillatable arm, a timer relay, a switch in control of the relay, switch operating means on the oscillatable arm arranged to operate the switch only on the return movement of the arm under the influence of the biasing means, means biasing the presser member to open position, and power means under the control of the timer relay connected to move the presser head against its bias.

2. A machine for shaping and pressing collars and like articles comprising, in combination with a presser head including a movable presser member and a slidable die member adapted to receive and shape an article and to deposit the article in the presser head, a pedal, a pivotally oscillatable arm operatively connected to the pedal, means biasing the die member from the presser head, connecting means between the oscillatable arm and the die member and operative to slide the die member against its bias and to return the arm under the influence of the biasing means, means biasing the movable presser member to non-pressing position, power means operative to move the movable presser member against its bias to pressing position, a control device for the power means, a timer relay in control of the control device, a switch mechanism for the timer relay disposed in proximate relation to the oscillatable arm, and tripping means on the arm operative to pass the switch idly when the arm is moved by the pedal and to operate the switch when the arm is moved by the die member biasing means.

3. A machine for shaping and pressing collars and like articles comprising, in combination with a presser head including a movable presser member and a slidable die member adapted to receive and shape an article and to deposit the article in the presser head, a pedal, a pivotally oscillatable arm operatively connected to the pedal, means biasing the die member from the presser head, connecting means between the oscillatable arm and the die member and operative to slide the die member against its bias and to return the arm under the influence of the biasing means, means biasing the movable presser member to non-pressing position, a cylinder, a piston slidable in the cylinder and operatively connected to the presser member to move it against its bias, a source of compressed air, a conduit communicating with the cylinder behind the piston, a rotary valve in the conduit operative in one position to connect the cylinder with the source of compressed air and in another position to vent the cylinder to the atmosphere, means biasing the valve to the latter position, a solenoid connected when energized to move the valve to its air admitting position, a source of electric current, a timer relay operative when energized to connect the solenoid with the source of current for a limited time and then to interrupt the connection, a micro-switch in control of the timer relay, and a tripper for the micro-switch on the oscillatable arm operative to close the switch as the arm is moved by the die member biasing means.

4. A machine for shaping and pressing collars and like articles comprising a presser head including a movable presser member, a reciprocatory die member movable into and out of the path of movement of the presser member and adapted to deposit an article in the presser head, means biasing the die member to its retracted position, means biasing the presser member to open position, power means operative to move the presser to closed position, pedal operated means connected to the die member and operative to move the die member against its bias, and means operated by the return movement of the pedal operated means for energizing the power means.

5. A machine for shaping and pressing collars and like articles comprising a presser head including a movable presser member, a reciprocatory die member movable into and out of the path of movement of the presser member and adapted to deposit an article in the presser head, means biasing the die member to its retracted position, means biasing the presser member to open position, power means operative to move the presser to closed position, pedal operated means connected to the die member and operative to move the die member against its bias, and means operated by the return movement of the pedal operated means for energizing the power means, said last named means including an automatic timer operative to limit the period of said energization.

REYNOLDS W. HOVELL.

REFERENCES CITED

The following references are of record in the file of this patent:

UNITED STATES PATENTS

| Number | Name | Date |
| --- | --- | --- |
| 2,226,143 | Self | Dec. 24, 1940 |
| 2,258,954 | Jensen | Oct. 14, 1941 |
| 2,292,846 | Pritchard | Aug. 11, 1942 |
| 2,341,689 | Bryson | Feb. 15, 1944 |
| 2,387,292 | Preston | Oct. 23, 1945 |
| 2,419,645 | Hurxthal | Apr. 29, 1947 |